March 18, 1941. C. F. TOUSSAINT 2,235,304
VALVE
Filed Dec. 1, 1938
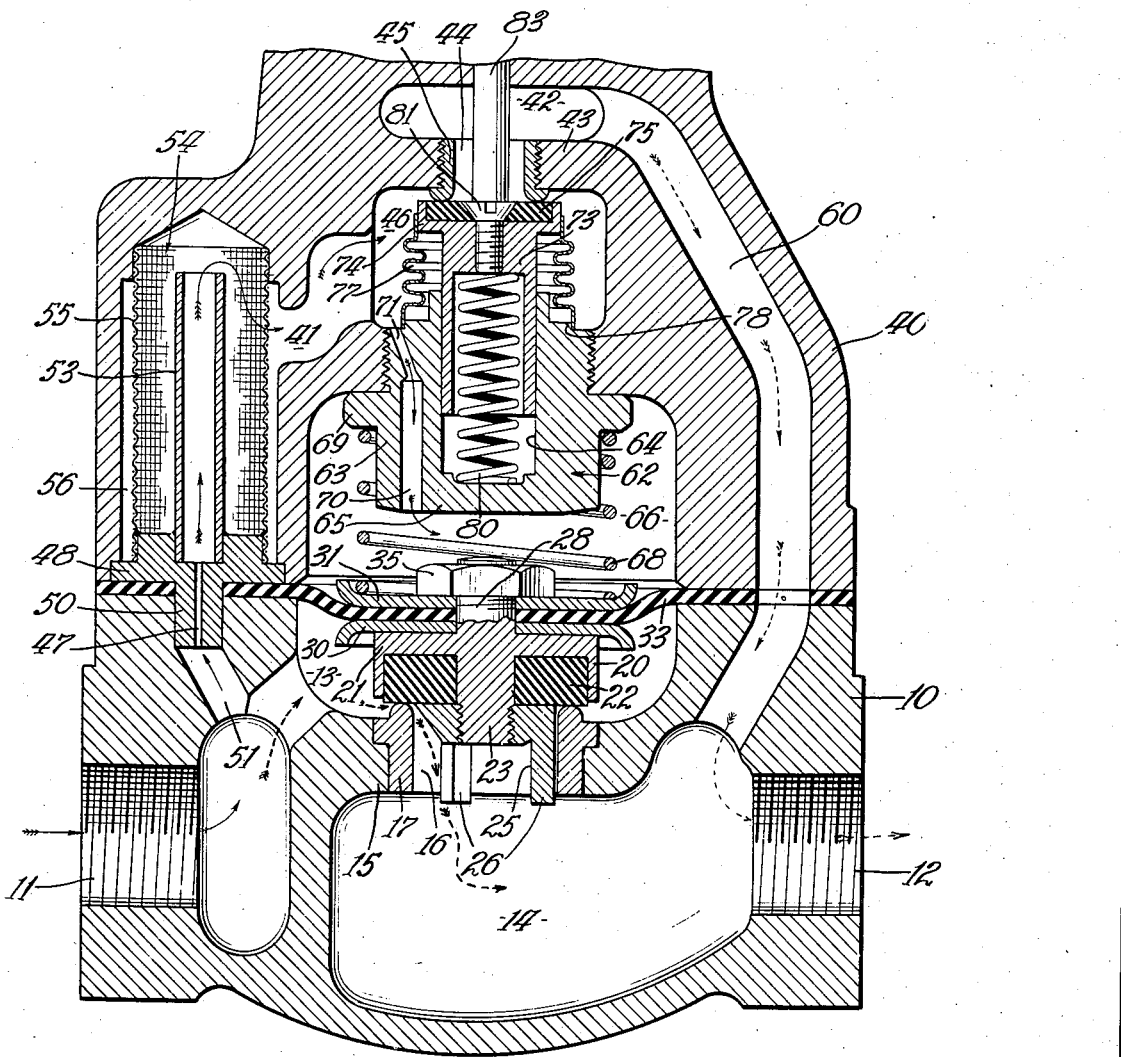
Inventor:
Charles F. Toussaint
By Robert L. Kahn Atty.

Patented Mar. 18, 1941

2,235,304

UNITED STATES PATENT OFFICE 2,235,304

VALVE

Charles F. Toussaint, Chicago, Ill., assignor to Perfection Gear Company, Harvey, Ill., a corporation of Illinois Application December 1, 1938, Serial No. 243,321

4 Claims. (Cl. 137—139)

This invention relates to valves for governing the flow of fluids and more particularly to a main valve and a pilot controlling valve together with damping means for insuring stability in the joint and several operations of the valves. For governing the flow of fluids such as gas or liquid, in large quantities or under high pressures or both, it is necessary to have substantial power for operating the valve. The setting of such valves is frequently in response to temperature or other changes. Unless such controls are elaborate or expensive, the power impulses for valve operation are relatively small. The same is true if a manual control over the valve is desired.

Since the fluid whose flow is to be governed by the valve has in it substantial energy by its very pressure or momentum, it is desirable to utilize this energy for actuating the controlling valve. By the invention hereinafter described a main valve is controlled by a smaller pilot valve. This pilot valve is small enough to be susceptible to direct control by the supervising means or manual means as desired. Physically the two valves are distinct so that the physical operation of one valve does not directly affect the other valve except by means of fluid pressure changes transmitted from one to the other. While in the valve shown, both pilot and main valves are combined into a compact structure, there is no reason why the two valves cannot be physically distinct from each other and connected by suitable conduits.

Because the two valves are physically independent of each other, it is possible to use a standard valve as the pilot. Thus for different sizes of main valves, the same pilot valve may be used. This is important from a cost viewpoint since pilot controlled valves are rarely made in one size in large quantities. By thus standardizing on a substantial part of the entire pilot controlled valve, considerable saving is possible on different sizes of valves.

The pilot valve is provided with damping means to prevent too sudden changes or oscillations in the valve setting. In order to promote smooth pilot valve operation and prolong the useful life thereof, the damping means is sealed against the ingress of dirt or contaminating fluids. Hence a valve of this character may be used for the control of corrosive fluids or fluids whose purity must be maintained at a high value and not contaminated by the damping fluid, if different from the fluid controlled.

Additional damping means is provided in the interconnecting conduits to prevent undesirable reaction of one valve on the other. This additional damping is operative independently of the pilot valve damping and may be used alone if desired.

Because the pilot and main valves are separate, there is also a minimum of machining operations. In fact the only precision ports of the main valve are the valve member and seat. Otherwise few finishing operations are necessary.

Means are also provided for screening the fluid going through the pilot valve so that little if any dirt is likely to get on the pilot valve seat or clog the connecting conduits.

In general, the invention contemplates a main valve having a valve member on the high pressure side of the main valve seat. Forming one boundary or wall of the main high pressure region is a flexible member which is adapted to move in response to the difference in pressure on opposite sides thereof. The main valve member is subjected to a resultant force which is the composite of the force tending to move said flexible member and a constant force tending to close the valve. A pilot valve is provided and has its high pressure region connected by a restricted conduit with the main inlet or high pressure region. The pilot high pressure region is also connected by a conduit which may be restricted to a chamber formed in part by the flexible member, which thus functions as a partition between the chamber and main high pressure region. The pilot low pressure region is connected by a conduit to the main outlet or low pressure region. The pilot valve itself has a valve member which may be either in the pilot low or high pressure regions, although shown in the high pressure region.

Thus at the pilot valve, the fluid pressure is directed along two paths. One path leads from the high pressure pilot side to the chamber and sets up a static pressure on the flexible member in opposition to the main high pressure. The other path at the pilot valve, when the valve is open, is a low fluid resistance path to the fluid discharge of both valves.

Normally the static pressure may more than balance the high pressure on the flexible member, due to the difference in effective area, with the result that the main valve member is closed. However, when the pilot valve opens, the pressure in the pilot high pressure region is reduced because of the pressure drop in the supply conduit. This results in a pressure drop in the chamber. Hence a sufficient pressure differential between the main high pressure region and chamber may exist to force the flexible member to open the valve. By providing a restricted conduit between the pilot high side and chamber a damping action is created. However additional damping means on the pilot valve member is preferred.

Referring to the drawing, the single figure is a sectional view of the pilot controlled valve, with arrows showing the path of main and pilot fluid.

As pointed out above, the main and pilot valves are physically separate although their casings have been combined somewhat. The main valve is provided with a main casing 10 of suitable material such as iron. This casing has an inlet port 11 and an outlet port 12. Inlet port 11 opens into a main high pressure side or region 13 while outlet port 12 opens into a low pressure side or region 14. A partition 15 having an aperture 16 separates these two regions. Partition 15 has suitably disposed therein, as by a press fit, a valve seat 17 of any suitable metal. It is understood of course that this valve seat is accurately finished at the seat proper.

Disposed in the main high pressure region 13 is a valve member generally designated as 20. This member comprises a body 21 having an annular insert 22 which actually functions as the valve member proper in cooperation with valve seat 17. This insert 22 is made of suitable metal and finished off so that a fluid tight seal at the main valve surfaces is obtained. Valve member body 20 has a bolt-like projection 23 upon which is threaded a guide 25. This guide has a plurality of fingers 26 which work inside aperture 16 against the opposing face of the seat insert 17. The guide 25 maintains the annular valve insert 22 in position and also maintains the valve in a true position during operation.

In line with bolt portion 23 is a second bolt portion 28 projecting from the valve member body 20. Disposed around bolt portion 28 are two metal washers 30 and 31 having their edges curled away from each other as shown. Between these washers is a flexible member or diaphragm 33 of rubber, leather, copper or any other suitable material which extends to the casing proper and which forms a wall for the main high pressure region 13. A nut 35 on bolt portion 28 is provided for rigidly clamping the flexible member between the washers 30 and 31.

Disposed over main valve casing 10 is a pilot valve casing 40. The two casings are suitably bolted together with the flexible member 33 between the opposing machined surfaces. Obviously flexible member 33 may be relied upon to serve as a gasket between the opposing casing surfaces. It is understood however that if flexible member 33 is of metal, additional gasket material may be provided between the casing surfaces to obviate the necessity for extreme accuracy in finishing these casing surfaces. Pilot valve casing 40 has an inlet port 41 and an outlet port 42 separated by a partition 43 suitably apertured at 44 and provided with a valve seat 45. This seat may be of suitable material and as shown here is threaded into place. The active side of the seat faces a pilot high pressure region 46.

Pilot inlet 41 is connected by a conduit to main inlet 11. This conduit comprises a restricted channel 47 formed in a metal insert 48. This insert 48 has a tubular projection 50 extending into a large channel 51 formed in the main valve casing 10 and leading from a portion of the main valve inlet. Insert 48 has a pipe 53 set into the center thereof over the bore or restricted channel 47. A large hollow region 54 is formed in the pilot valve casing to accommodate pipe 53 and a cylindrical strainer 55 is supported from insert 48. Region 54 is large enough to provide an annular free space 56 around the outside of strainer 55. The precise shape of strainer 55 and the region 54 is unimportant. In fact, if no dirt is present in the fluid to be controlled, the strainer may be omitted entirely. Between pilot inlet 41 and main inlet 11, the only element of importance is bore 47. The insert is merely a matter of convenience so that different size bores may be used to control the valve characteristics.

Pilot outlet 42 is connected by a conduit 60 to main valve outlet 12. This conduit is preferably large enough to permit the free flow of fluid passed by the pilot valve.

Threaded into an interior portion of pilot valve casing 40 is a pilot valve member assembly generally designated as 62. This assembly comprises a body 63 having a cylinder 64 facing the pilot valve seat and having a head 65 projecting into a chamber 66. This chamber 66 is formed by pilot casing 40 together with head 65 and flexible member 33. Around head 65 is a coil spring 68, one end of which rests against a shoulder 69 of the pilot valve member assembly and the other end of which is disposed on washer 31. Spring 68 tends to press the main valve member down into closed position. Preferably head 65 is near enough to the main valve member to limit its opening movements to a point where guides 25 are still operative.

Body 63 of the pilot valve member assembly is provided with a channel 70, part of which is constricted at 71, to form a restricted conduit between the pilot valve high pressure region 46 and chamber 66.

Slidably disposed in cylinder 64 of the pilot valve member body is a piston 73 having an enlarged head 74 into which is disposed an annular valve member insert 75. This insert is made of suitable material, finished accurately so that with its seat 45 a fluid tight pilot valve results. Surrounding piston 73 is a cylindrical corrugated bellows 77 of suitable material such as copper. The ends of bellows 77 are sealed to piston head 74 and a shoulder 78 on body 63. The interior of piston 73 is hollowed out as shown. A coil spring 80 is disposed in cylinder 64 between the opposing piston and body faces to bias the pilot valve to its closed position.

A suitable axial channel is cut through the head of piston 73 and is suitably threaded to accommodate a sealing screw 81. As shown, the tapered head of the screw 81 fills the space in the center of valve insert 75. A rod 83 projecting through the pilot valve casing 40 into aperture 44 is adapted to bear against sealing screw 81 to control the position of the pilot valve. It is understood of course that other sealing means may be used, such as solder. In fact, if a hermetic seal is necessary, screw 81 may be soldered in place.

Cylinder 64 of the pilot valve is filled with any suitable medium for damping purposes. Thus oil, glycerine or any liquid may be used in combination with a suitable air space. Air or gas alone may be used if desired.

It is understood of course that piston 73 has sufficient clearance to permit leakage of the damping medium into the space just inside of bellows 77.

The operation of the valve while described in general terms previously may be briefly reviewed. Normally with the pilot valve closed, static inlet pressure will exist on both sides of flexible member 33 and thus permit the main valve to remain closed. Obviously the restricted conduits providing fluid communication between both sides of the flexible member 33 will have no effect in the absence of fluid flow therethrough. Upon the opening of the pilot valve, a sustained pilot fluid flow will be established right through the pilot valve aperture 44. This sustained flow through constricted bore 47 will cause the pressure in region 46, the pilot high pressure region, to be less than the pressure in main inlet 11 or main high pressure region 13. The reduced pilot high pressure will be communicated to chamber 66 and thus result in a pressure differential on flexible member 33. The resulting movement of flexible member 33 will cause main valve member 20 to be pulled away from its seat and establish a fluid flow through the main valve.

It should be noted that the bore 47 in the conduit between the two high pressure regions is solely responsible for main valve opening movements. The constriction 71 in the conduit between the pilot high pressure region and chamber 66 merely prevents sudden pressure changes in chamber 66. The fluid flow through this latter conduit is not sustained but is merely a displacement flow to compensate for volumetric changes in chamber 66 due to the movement of flexible member 33 and thus tends to damp the movement of the main valve.

The additional damping action of the piston 73 in cylinder 64 is obvious. This damping is applied to pilot valve member 85 and stabilizes the valve.

It is desirable to concentrate the pilot fluid pressure drop in bore 47 so that accurate control of the valve characteristics will result from bore control.

It will be clear that oscillation or hammering will be impossible with the construction shown. This is important when handling incompressible fluids as water. Thus the cylinder 64 and piston 73 damp the operating rod 83 and pilot valve member proper. Restriction 71 damps any surges between chamber 66 and the pilot high pressure region. In other words sudden reaction between the pilot valve and main valve through chamber 66 is eliminated. Constriction 47 also prevents sudden reaction between the two valves because of any possible pressure surges in the main high pressure region. The heavy damping prevents oscillations from being generated but permits the valves to cooperate.

It is obvious that the pilot valve and main valve may be remote from each other. Thus the two restricted conduits can be as long as desired within obvious limits. While the pilot valve member head 65 functions as an anchor for the main valve spring and also as a stop to limit the opening movement of the main valve member, it is obvious that these two functions could be performed by the main valve casing if necessary.

It is also understood that the pilot valve member need not necessarily be on the high side. The valve proper and seat may easily be disposed in the low pressure region 42.

One important element in the design of the valve system is the ratio of area of flexible member to that of the main valve member facing aperture 16. With the main valve member closed, a substantial area facing aperture 16 is not under high pressure. This means that there is a pressure differential on the valve proper which tends to keep it closed, apart from the action of spring 68. This is the same as if there was a difference in area between the two sides of the flexible member with the larger effective area on the chamber side. This difference in area is the area of the main valve member facing aperture 16. Obviously the greater the ratio of flexible member area to the valve area facing aperture 16, the smaller will be the differential force on the flexible member, assuming equal pressures on opposite sides, in comparison to the total force acting on a side of the flexible member.

Thus it is possible to have the flexible member area small enough in comparison to the valve area to cause the main valve to have only two stable positions; i. e. closed or full open. After the main valve member has opened somewhat, the additional area facing aperture 16 is made available as an operating force so that an additional opening force is generated. In such case, a trigger action will result with the pilot valve merely closing or fully opening the main valve. For certain purposes this action is highly desirable. Thus if water having substantial sediment is being handled, the sudden full opening of the main valve is desirable to flush the valve clean.

On the other hand, if the valve area is small in comparison to the flexible member area, then the differential force may become so small that it loses its critical power. In that case a modulating action can be obtained with the main valve following the pilot valve in a predetermined fashion. Hence by controlling the fluid resistance characteristics of the bore 47 and controlling the flexible member area as compared to the main valve area, radically different valve characteristics may be obtained. It is clear that as the main valve becomes more of a two position valve, the necessity for a spring bias disappears. When the main valve member is closed or even just barely open, a strong closing force is generated on the valve itself.

Another factor which has some effects on valve operation is the fluid flow resistance through the main valve. This may be very low if desired. There will always be a pressure differential on opposite sides of the valve apertures, both main and pilot, and in view of that the terms "high pressure" and "low pressure" have been used. It is to be understood, however, that these terms merely describe the side of the valve aperture to be considered and do not necessarily imply any substantial pressure differential.

The valve proper may have rubber valve member inserts. In this way, the necessity for accurate machine work is eliminated. In the case where the main valve merely opens or closes all the way, the rubber insert is particularly desirable. The valve can be designed so that it closes firmly and quickly. With metal to metal action, a quick hard closing would tend to wear the valve and make considerable noise.

What I claim is:

1. In combination, a main valve and pilot controlling valve therefor, comprising individual valve casings, each casing having an apertured partition separating each casing interior into high and low pressure regions, main and pilot valve members cooperating respectively with the main and pilot apertured partitions to control the flow of fluid therethrough, said main valve member being on the high pressure side of the cooperating partition, means for biasing said main valve member to a closed position, means external to the valves for controlling the pilot valve member, a sealed chamber adjacent the main high pressure region and having as a partition therebetween a pressure responsive flexible member, means connecting a movable portion of said flexible member to said main valve member to impart valve controlling movements thereto with said main valve tendng to open upon main high pressure region enlarging movements of said flexible member, a fluid conduit connecting the two low pressure regions, a second fluid conduit connecting the pilot high pressure region and said chamber, and a third fluid conduit connecting the two high pressure regions, said second conduit being restricted in comparison to the volume of said sealed chamber to resist sudden volumetric changes in said sealed chamber and said third conduit being restricted in comparison to both said first conduit and the fluid path through said main valve when open whereby a fluid pressure drop in said third conduit occurs on fluid flow therethrough, said pressure drop being communicated to said sealed chamber interior to thus create a pressure differential on opposite sides of said flexible member for main valve opening movement.

2. In combination, a main valve and pilot controlling valve therefor comprising individual valve casings, each casing having an apertured partition separating each casing interior into high and low pressure regions, main and pilot valve members cooperating respectively with the main pilot apertured partitions to control the flow of fluid therethrough, said main valve member being on the high pressure side of the cooperating partition, means for biasing said main valve member to a closed position, means external to the valves for controlling the pilot valve member, means for maintaining said two casings together to form a sealed chamber adjacent the main high pressure region and having as a partition therebetween a pressure responsive flexible member rigidly clamped at its edges between the two casings and carrying the main valve member at the center thereof, said flexible member serving to impart valve controlling movements thereto with said main valve tending to open upon main high pressure region enlarging movements of said flexible member, a fluid conduit connecting the two low pressure regions, a second fluid conduit connecting the pilot high pressure region and said chamber, and a third fluid conduit connecting the two high pressure regions, said second conduit being restricted in comparison to the volume of said sealed chamber to resist sudden volumetric changes in said sealed chamber and said third conduit being restricted in comparison to both said first conduit and the fluid path through said main valve when open whereby a fluid pressure drop in said third conduit occurs on fluid flow therethrough, said pressure drop being communicated to said sealed chamber interior to thus create a pressure differential on opposite sides of said flexible member for main valve opening movement.

3. In combination, a main valve and pilot controlling valve therefor comprising individual valve casings, each casing having an apertured partition separating each casing interior into high and low pressure regions, main and pilot valve members cooperating respectively with the main and pilot apertured partitions to control the flow of fluid therethrough, said main valve member being on the high pressure side of the cooperating partition, means for biasing said main valve member to a closed position, means external to the valves for controlling the pilot valve member, means for maintaining said two casings together to form a sealed chamber therebetween adjacent the main high pressure region and having as a partition therebetween a pressure responsive flexible member, means for mounting said main valve member at a movable portion of said flexible member to impart valve controlling movements thereto with said main valve tending to open upon main high pressure region enlarging movements of said flexible member, a guide on said main valve member cooperating with the main partition to maintain said main valve member in aligned position, means carried by said pilot valve casing to limit the opening movement of said main valve member, a fluid conduit connecting the two low pressure regions, a second fluid conduit connecting the pilot high pressure region and said chamber, and a third fluid conduit connecting the two high pressure regions, said third conduit having a fluid flow resistance high in comparison to that of any path having a sustained fluid flow.

4. The combination of claim 3 wherein said pilot valve member and the means for limiting the movement of said main valve member form a part of an assembly mounted as a removable unit in said pilot valve casing.

CHARLES F. TOUSSAINT.